United States Patent
Chow et al.

(10) Patent No.: US 11,738,547 B2
(45) Date of Patent: Aug. 29, 2023

(54) GAS PERMEABLE FILM AND MULTILAYER ARTICLE FOR PACKAGING

(71) Applicant: Kuraray Co., Ltd., Okayama (JP)

(72) Inventors: Edgard Chow, Houston, TX (US); Emilio Morales, Houston, TX (US); Wataru Hirose, Houston, TX (US)

(73) Assignee: Kuraray Co., Ltd., Okayama (JP)

( * ) Notice: Subject to any disclaimer, the term of this patent is extended or adjusted under 35 U.S.C. 154(b) by 0 days.

(21) Appl. No.: 17/472,549

(22) Filed: Sep. 10, 2021

(65) Prior Publication Data

US 2022/0081523 A1 Mar. 17, 2022

Related U.S. Application Data

(60) Provisional application No. 63/077,135, filed on Sep. 11, 2020.

(51) Int. Cl.
*B32B 27/30* (2006.01)
*B32B 7/12* (2006.01)
*B32B 27/08* (2006.01)
*B32B 27/32* (2006.01)
*B65D 65/40* (2006.01)
*C08J 5/18* (2006.01)
*C08L 29/04* (2006.01)

(52) U.S. Cl.
CPC .............. *B32B 27/306* (2013.01); *B32B 7/12* (2013.01); *B32B 27/08* (2013.01); *B32B 27/32* (2013.01); *B65D 65/40* (2013.01); *C08J 5/18* (2013.01); *C08L 29/04* (2013.01); *B32B 2250/05* (2013.01); *B32B 2250/246* (2013.01); *B32B 2250/40* (2013.01); *B32B 2272/00* (2013.01); *B32B 2307/7244* (2013.01); *B32B 2307/732* (2013.01); *B32B 2439/46* (2013.01); *B32B 2439/70* (2013.01); *C08J 2329/04* (2013.01); *C08J 2423/06* (2013.01); *C08J 2423/08* (2013.01); *C08L 2203/16* (2013.01); *C08L 2205/03* (2013.01)

(58) Field of Classification Search
CPC .................................................. B32B 27/306
See application file for complete search history.

(56) References Cited

U.S. PATENT DOCUMENTS

2017/0087812 A1* 3/2017 Hirose ................. C08J 5/18

* cited by examiner

*Primary Examiner* — Zachary M Davis
(74) *Attorney, Agent, or Firm* — Morgan, Lewis & Bockius LLP

(57) ABSTRACT

A gas permeable layer is formed from an ethylene-vinyl alcohol copolymer resin composition comprising an ethylene-vinyl alcohol copolymer (A), a polyolefin (B), and an acid-modified ethylene-α-olefin copolymer (C).

21 Claims, No Drawings

GAS PERMEABLE FILM AND MULTILAYER ARTICLE FOR PACKAGING

CROSS-REFERENCE TO RELATED APPLICATIONS

This application claims priority under 35 U.S.C. § 119 from U.S. Provisional Application Ser. No. 63/077,135, filed 11 Sep. 2020, the disclosure of which is incorporated by reference herein for all purposes as if fully set forth.

FIELD OF THE DISCLOSURE

The present disclosure relates to a gas permeable film and a recyclable multilayer article having the gas permeable film with medium barrier properties which is suitable for packaging, for example, of beverage and food, such as cheese. In one aspect, the multilayer article comprises the gas permeable film comprising an ethylene-vinyl alcohol copolymer (A), a polyolefin (B) and an acid-modified ethylene-α-olefin copolymer (C) with specific blend ratio, which provides medium barrier properties, excellent shelf life for the packaged beverage or food, and recyclability.

BACKGROUND

In general, oxygen barrier and carbon dioxide barrier are important properties for packaging of foods and beverages to extend their shelf life. EVOH is well known as a material having good oxygen barrier and carbon dioxide barrier, and is applied in an extensive range of applications, especially in food packaging area. However, some foods like cheese needs to respire in some extent. Thus, packaging of cheese requires some oxygen ingress and carbon dioxide release. Barrier properties of EVOH are too high so that EVOH is not suitable for the aforementioned food packaging application. From the reason, polyamide (PA) which has medium barrier properties is widely used for the packaging of beverage or food, such as cheese.

On the other hand, it is said that PA is difficult to be recycled if it is used in flexible packaging. Usage of PA for flexible packaging is often restricted due to recent industry trends to use recyclable packaging. Thus, medium barrier material which has good recyclability is required by packaging industries. EVOH is said to be a preferable barrier material for recycle industry.

The prior arts do not teach a material which exhibits both of suitable medium barrier properties required for cheese packaging and excellent recyclability. The article of the present disclosure establishes a recyclable multilayer article having medium barrier properties which is suitable for packaging of beverage or food, such as cheese. It has been found that combination of EVOH, polyolefin and an acid-modified ethylene-α-olefin copolymer with specific blend ratio can provide stable medium barrier properties. Furthermore, by using the material as a layer of multilayer article to have suitable carbon dioxide barrier properties, the multilayer articles showed good results on both recyclability and shelf life test for cheese.

SUMMARY

In one aspect, the present disclosure relates to a gas permeable film comprising: an ethylene-vinyl alcohol copolymer (A), a polyolefin (B), and an acid-modified ethylene-α-olefin copolymer (C). In some embodiments, a mass ratio [(A)/((B)+(C))] of the ethylene-vinyl alcohol copolymer (A) to a total amount of the unmodified polyolefin (B) and the acid modified ethylene-α-olefin copolymer (C) is from 78/22 to 62/38. In further embodiments, the mass ratio [(A)/((B)+(C))] is from 75/25 to 65/35 or 3.0 to 1.8. In additional embodiments, an oxygen permeability of the gas permeable film at 20° C./65% RH is 10 cc·20 μm/m²·day·atm or more, and 100 cc·20 μm/m²·day·atm or less. In yet additional embodiments, the gas permeable film is a monolayer film.

In additional embodiments, an ethylene content of the ethylene-vinyl alcohol copolymer (A) is at least 45 mol %. In further embodiments, an ethylene content of the ethylene-vinyl alcohol copolymer (A) is from 46 mol % to 55 mol %. In yet further embodiments, an ethylene content of the ethylene-vinyl alcohol copolymer (A) is from 47 to 49 mol %. In yet further embodiments, an ethylene content of the ethylene-vinyl alcohol copolymer (A) is 48 mol %.

In some embodiments, a thickness of the gas permeable film is from 2 μm to 30 μm, or 3 μm to 15 μm.

In additional embodiments, the gas permeable film has a matrix and domain structure, wherein the matrix comprises the ethylene-vinyl alcohol copolymer (A), and the domain comprises the polyolefin (B) and the acid-modified ethylene-α-olefin copolymer (C).

In yet additional embodiments, the polyolefin (B) comprises at least one selected from the group consisting of polyethylenes; polyethylene copolymer resins; polypropylene resins; polybutenes; polypentenes; graft polyolefins; cyclic polyolefin resins; ionomers; an ethylene-vinyl acetate copolymer; an ethylene-acrylic acid copolymer; an ethylene-acrylic acid ester copolymer. In further embodiments, the acid-modified ethylene-α-olefin copolymer (C) obtained by copolymerization in which part of monomers constituting an ethylene-α-olefin copolymer is substituted by α,β-unsaturated carboxylic acid or anhydride monomers thereof; or by introducing α,β-unsaturated carboxylic acid or an anhydride thereof to part of side chains by graft reaction, and the α,β-unsaturated carboxylic acids or the anhydrides thereof comprise at least one selected from the group consisting of maleic acid, acrylic acid, itaconic acid, crotonic acid, maleic anhydride, and itaconic anhydride. In additional embodiments, the α-olefin monomer includes propylene, 1-butene, 1-hexene, 1-octene, 4-methyl-1-pentene, 1-decene, 1-dodecene, 1-tridecene, 1-tetradecene, 1-pentadecene, 1-hexadecene, 1-heptadecene, 1-octadecene, 1-nonadecene or a mixture thereof. In further embodiments, the ethylene-α-olefin copolymer comprises ethylene-propylene copolymer, ethylene-butene copolymer, or a mixture thereof. In yet further embodiments, the acid-modified ethylene-α-olefin copolymer (C) has an acid value from 1 mg KOH/g to 50 mg KOH/g and/or a density of about 0.9 g/cm³ or less.

In some embodiments, the gas permeable film further comprises at least one component selected from the group consisting of a boron compound, an alkali metal salt, a phosphoric acid compound, an oxidizable substance, another polymer, and an oxidization accelerator.

In some embodiments, X value of the gas permeable film calculated by formula (a) is from about 7.6 to about 14.9:

$$X=[1/(100-R)]\times T\times 100 \tag{a}$$

in which R is the mass ratio [(A)/((B)+(C))] of the ethylene-vinyl alcohol copolymer (A) to a total amount of the unmodified polyolefin (B) and the acid modified ethylene-α-olefin copolymer (C) in the gas permeable film, and T is a thickness of said gas permeable film.

In additional embodiments, Y value of the gas permeable film calculated by formula (b) is from about 3.6 to about 6.8:

$$Y = X/(0.001 \times \mathrm{EXP}(0.16 \times E)) \qquad (b),$$

in which E is ethylene content (mol %) of an ethylene-vinyl alcohol copolymer in the gas permeable film.

In another aspect, the present disclosure relates to a multilayer article comprising the gas permeable film disclosed herein. In some embodiments, the multilayer article is recyclable.

In some embodiments, carbon dioxide transmission rate (CO2TR) of the multilayer article at 20 deg C./0% RH in accordance with ASTM F2476-13 is greater than 200 $cc/m^2 \cdot day \cdot atm$ and less than 600 $cc/m^2 \cdot day \cdot atm$.

In additional embodiments, oxygen transmission rate (OTR) of the multilayer article at 20 degC/65% RH in accordance with ASTM F1927-14 is greater than 50 $cc/m^2 \cdot day \cdot atm$ and less than 150 $cc/m^2 \cdot day \cdot atm$.

In additional embodiments, the gas permeable film is an intermediate layer. In another embodiment, the multilayer article has (i) a core layer (E) obtained from the EVOH resin composition of the present disclosure, (ii) an outer layer (T) obtained from a polyolefin resin, and/or (iii) an adhesive layer (AD) between the core layer and the outer layer. In another embodiment, the multilayer structure is T/AD/E/AD/T or T/T/AD/E/AD/T/T.

In some embodiments, a thickness of the core layer E is from about 2 μm to about 30 μm. In additional embodiments, a total thickness of the multilayer article is from 50 μm to 500 μm. In further embodiments, a thickness of the outer layer is from 20 μm to 200 μm. In yet further embodiments, a thickness of the adhesive layer is from 2 μm to 30 μm.

In additional embodiments, the adhesive layer (AD) comprises an acid-functionalized polymer resin composition. In some embodiments, the adhesive layer (AD) comprises at least one adhesive resin selected from the group consisting of polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer.

In additional embodiments, the hydrophobic thermoplastic resin comprises at least one resin selected from the group consisting of polyolefin resins; polyethylenes; polyethylene copolymer resins; polypropylene resins; polybutenes; polypentenes; graft polyolefins; ionomers; an ethylene-vinyl acetate copolymer; an ethylene-acrylic acid copolymer; and an ethylene-acrylic acid ester copolymer. In further embodiments, the outer layer further comprises a light stabilizer.

In another aspect, the present disclosure also relates to methods of producing the gas permeable film comprising a ribbon blender, a high-speed mixer-co-kneader, a mixing roll, an extruder, or an intensive mixer. In another aspect, the present disclosure further relates to methods of producing the multilayer article, comprising melt extruding.

According to the present disclosure, the multilayer article according to some embodiments showed good results on both recyclability and shelf life test for cheese. Thus, it is suitable for a recyclable cheese packaging.

These and other embodiments, features and advantages of the present disclosure will be more readily understood by those of ordinary skill in the art from a reading of the following detailed description.

DETAILED DESCRIPTION

In one aspect, the present disclosure relates to a recyclable multilayer article having medium barrier properties which is suitable for the packaging, for example, of beverage or food, such as cheese. In another aspect, the multilayer article comprises a gas permeable film comprising an ethylene-vinyl alcohol copolymer (A), a polyolefin (B) and an acid-modified ethylene-α-olefin copolymer (C) with specific blend ratio. The multilayer article has a suitable thickness range to have specific range of carbon dioxide barrier. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Unless stated otherwise, all percentages, parts, ratios, etc., are by weight.

Unless stated otherwise, pressures expressed in psi units are gauge, and pressures expressed in kPa units are absolute. Pressure differences, however, are expressed as absolute (for example, pressure 1 is 25 psi higher than pressure 2).

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used, it is used to mean a certain effect or result can be obtained within a certain tolerance, and the skilled person knows how to obtain the tolerance. When the term "about" is used in describing a value or an end-point of a range, the disclosure should be understood to include the specific value or end-point referred to. In some embodiments, the term "about" refers to a range of values that fall within 10, 9, 8, 7, 6, 5, 4, 3, 2, 1 percent or less of the stated reference value.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus.

The transitional phrase "consisting of" excludes any element, step, or ingredient not specified in the claim, closing the claim to the inclusion of materials other than those recited except for impurities ordinarily associated therewith. When the phrase "consists of" appears in a clause of the body of a claim, rather than immediately following the preamble, it limits only the element set forth in that clause; other elements are not excluded from the claim as a whole.

The transitional phrase "consisting essentially of" limits the scope of a claim to the specified materials or steps and those that do not materially affect the basic and novel characteristic(s) of the gas permeable film, multilayer article, or methods of producing the same disclosure herein.

A "consisting essentially of" claim occupies a middle ground between closed claims that are written in a "consisting of" format and fully open claims that are drafted in a "comprising" format. Optional additives as defined herein, at a level that is appropriate for such additives, and minor impurities are not excluded from a composition by the term "consisting essentially of".

Further, unless expressly stated to the contrary, "or" and "and/or" refers to an inclusive and not to an exclusive. For example, a condition A or B, or A and/or B, is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "predominant portion" or "predominantly", as used herein, unless otherwise defined herein, means greater than 50% of the referenced material. If not specified, the percent is on a molar basis when reference is made to a molecule (such as hydrogen and ethylene), and otherwise is on a mass or weight basis (such as for additive content).

The term "substantial portion" or "substantially", as used herein, unless otherwise defined, means all or almost all or the vast majority, as would be understood by the person of ordinary skill in the context used. It is intended to take into account some reasonable variance from 100% that would ordinarily occur in industrial-scale or commercial-scale situations.

The term "depleted" or "reduced" is synonymous with reduced from originally present. For example, removing a substantial portion of a material from a stream would produce a material-depleted stream that is substantially depleted of that material. Conversely, the term "enriched" or "increased" is synonymous with greater than originally present.

As used herein, the term "copolymer" refers to polymers comprising copolymerized units resulting from copolymerization of two or more comonomers. In this connection, a copolymer may be described herein with reference to its constituent comonomers or to the amounts of its constituent comonomers, for example "a copolymer comprising ethylene and 15 mol % of a comonomer", or a similar description. Such a description may be considered informal in that it does not refer to the comonomers as copolymerized units; in that it does not include a conventional nomenclature for the copolymer, for example International Union of Pure and Applied Chemistry (IUPAC) nomenclature; in that it does not use product-by-process terminology; or for another reason. As used herein, however, a description of a copolymer with reference to its constituent comonomers or to the amounts of its constituent comonomers means that the copolymer contains copolymerized units (in the specified amounts when specified) of the specified comonomers. It follows as a corollary that a copolymer is not the product of a reaction mixture containing given comonomers in given amounts, unless expressly stated in limited circumstances to be such.

For convenience, many elements of the present invention are discussed separately, lists of options may be provided and numerical values may be in ranges; however, for the purposes of the present disclosure, that should not be considered as a limitation on the scope of the disclosure or support of the present disclosure for any claim of any combination of any such separate components, list items or ranges. Unless stated otherwise, each and every combination possible with the present disclosure should be considered as explicitly disclosed for all purposes.

Although methods and materials similar or equivalent to those described herein can be used in the practice or testing of the present disclosure, suitable methods and materials are described herein. The materials, methods, and examples herein are thus illustrative only and, except as specifically stated, are not intended to be limiting.

EVOH Resin Composition

In one aspect, the resin composition used for the gas permeable film and multilayer article of the present disclosure is an EVOH resin composition which has an ethylene-vinyl alcohol copolymer (A) and a polyolefin (B) and an acid-modified ethylene-α-olefin copolymer (C).

Ethylene-Vinyl Alcohol (EVOH) Copolymer (A)

The EVOH of the EVOH resin composition is a copolymer having as a main structural unit an ethylene unit and a vinyl alcohol unit.

The EVOH (A) may have, as a lower limit of ethylene unit content (a proportion of the number of ethylene units to the total number of monomer units in the EVOH (A)), an ethylene unit content of about 20, 21, 22, 23, 24, 25, 26, 27, 28, 29, 30, 31, 32, 33, 34, 35, 36, 37, 38, 39, 40, 41, 42, 43, 44, 45, 46, 47, 48 mol % or greater. In some embodiments, the lower limit may be 44 mol % or greater. In some embodiments, the lower limit may be 45 mol % or greater. In some embodiments, the lower limit may be 46 mol % or greater. On the other hand, the EVOH (A) may have, as an upper limit of ethylene unit content, an ethylene unit content about 60, 59, 58, 57, 56, 55, 54, 53, 52, 51, 50, 49, 48 mol % or less. In some embodiments, the upper limit may be 55 mol % or less. The EVOH (A) having an ethylene unit content of no less than the lower limit may give suitable barrier properties and gives excellent melt moldability. In addition, the EVOH (A) having an ethylene unit content of no greater than the upper limit may give suitable barrier properties. In additional embodiments, an ethylene content of the ethylene-vinyl alcohol copolymer (A) is from about 40 mol % to about 55 mol %, preferably from about 40 mol % to about 50 mol %, from about 46 mol % to about 50 mol %, from about 44 mol % to about 48 mol %, from about 46 mol % to about 48 mol %, and preferably about 48% mol %.

The EVOH (A) may have, as a lower limit of degree of saponification (a proportion of the number of vinyl alcohol units to the total number of the vinyl alcohol units and vinyl ester units in the EVOH (A)), a degree of saponification of about 80, 81, 82, 83, 84, 85, 86, 87, 88, 89, 90, 91, 92, 93, 94, 95, 96, 97, 98, 99 mol % or greater. In some embodiments, the lower limit may be 95 mol % or greater. In some embodiments, the lower limit may be 99 mol % or greater. On the other hand, the EVOH (A) has, as an upper limit of degree of saponification, a degree of saponification of (substantially) 100 mol %, or about 99.99 mol % or less. The EVOH (A) having a degree of saponification of no less than the lower limit gives excellent oxygen barrier properties and thermal stability.

A method of preparing the ethylene-vinyl alcohol copolymer is not particularly limited, and may include well-known preparing methods. For example, in a general method, an ethylene-vinyl ester copolymer obtained by copolymerizing ethylene and vinyl ester monomer is saponified under the presence of a saponification catalyst, in an organic solvent including alcohol.

Examples of the vinyl ester monomer may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Particularly, vinyl acetate is preferable.

A method of copolymerizing ethylene and vinyl ester monomer may include well-known methods such as solution polymerization, bulk polymerization, suspension polymerization, and emulsion polymerization. As a polymerization initiator, an azo-based initiator, peroxide-based initiator, redox-based initiator, and the like may be properly selected according to a polymerization method. The copolymerization may be performed under presence of thiol compounds such as thioacetic acid and mercaptopropionic acid, or other chain-transfer agents.

For the saponification reaction, alcoholysis, hydrolysis, and the like, which uses a well-known alkali catalyst or acidic catalyst as a saponification catalyst in an organic solvent, may be used. In particular, a saponification reaction using a caustic soda catalyst with methanol as a solvent is simple and easy.

The EVOH (A) described herein may be a combination of two or more different types of EVOH. For example, the EVOH can be composed of a mixture of two or more types of EVOH that are different in ethylene unit content, with the combination having an ethylene content that is calculated as an average value from a mixed mass ratio. In this case, the difference between two types of EVOH that have different ethylene unit contents is typically about 30 mol % or less, or about 20 mol % or less, or about 15 mol % or less.

Similarly, the EVOH (A) can be composed of a mixture of two or more types of EVOH that are different in degree of saponification, with the combination having a degree of saponification that is calculated as an average value from a mixed mass ratio. In this case, the difference in degree of saponification is typically about 7% or less, or about 5% or less.

In some embodiments, when the EVOH resin composition is molded into a multilayered structure that is desired, as a multilayered structure, to achieve a balance between thermal moldability and oxygen barrier properties at a high level, the EVOH may be obtained by mixing an EVOH having an ethylene unit content of from about 24 mol % to about 34 mol % and a degree of saponification of about 99% or greater, with an EVOH having an ethylene unit content of from about 34 mol % to about 50 mol % and a degree of saponification of about 99% or greater, in a blending mass ratio of about 60/40 to about 90/10.

The ethylene unit content and the degree of saponification of the EVOH can be determined by nuclear magnetic resonance (NMR) analysis by conventional methods as recognized by one or of ordinary skill in the relevant art.

The EVOH typically has, as a lower limit of a melt flow rate (a measured value at a temperature of 190° C. and a load of 2160 g in accordance with JIS K 7210), a melt flow rate of about 0.1 g/10 min or more, or about 0.5 g/10 min or more, or about 1 g/10 min or more, or about 3 g/10 min or more. On the other hand, the EVOH typically has, as an upper limit of a melt flow rate, a melt flow rate of about 200 g/10 min or less, or about 50 g/10 min or less, or about 30 g/10 min or less, or about 15 g/10 min or less, or about 10 g/10 min or less.

In the case of EVOH has melting point above 190° C., a melt flow rate may need to be measured at 210° C. The EVOH typically has, as a lower limit of a melt flow rate at 210° C. (a measured value at a load of 2160 g in accordance with JIS K 7210), a melt flow rate of about 0.3 g/10 min or more, or about 1.0 g/10 min or more, or about 3.0 g/10 min or more. On the other hand, the EVOH typically has, as an upper limit of a melt flow rate, a melt flow rate of about 100 g/10 min or less, or about 50 g/10 min or less, or about 30 g/10 min.

The EVOH having a melt flow rate value in the above ranges may improve melt kneadability and melt moldability of a resultant resin composition.

A modified EVOH can also be used. For example, a modified EVOH can have at least one structural unit selected from, for example, structural units (I) and (II) shown below.

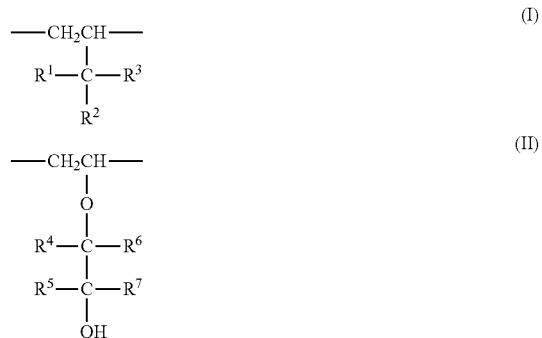

When present, such the structural unit are present at a ratio of from about 0.5 mol % to about 30 mol % based on the total structural units. Such a modified EVOH may improve flexibility and moldability of a resin or a resin composition.

Each of $R^1$, $R^2$ and $R^3$ in the above formula (I) independently represents a hydrogen atom, an aliphatic hydrocarbon group having 1 to 10 carbon atoms, an alicyclic hydrocarbon group having 3 to 10 carbon atoms, an aromatic hydrocarbon group having 6 to 10 carbon atoms, or a hydroxy group. Also, one pair of $R^1$, $R^2$ or $R^3$ may be combined together (excluding a pair of $R^1$, $R^2$ or $R^3$ in which both of them are hydrogen atoms). Further, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, a carboxy group or a halogen atom. On the other hand, each of $R^4$, $R^5$, $R^6$ and $R^7$ in the above formula (II) independently represents the hydrogen atom, the aliphatic hydrocarbon group having 1 to 10 carbon atoms, the alicyclic hydrocarbon group having 3 to 10 carbon atoms, the aromatic hydrocarbon group having 6 to 10 carbon atoms, or the hydroxy group. $R^4$ and $R^5$, or $R^6$ and $R^7$ may be combined together (excluding when both $R^4$ and $R^5$ or both $R^6$ and $R^7$ are hydrogen atoms). Also, the aliphatic hydrocarbon group having 1 to 10 carbon atoms, the alicyclic hydrocarbon group having 3 to 10 carbon atoms, or the aromatic hydrocarbon group having 6 to 10 carbon atoms may have the hydroxy group, an alkoxy group, the carboxy group or the halogen atom.

In another example, the following modified EVOH can be used as the EVOH, wherein the modified EVOH copolymer is represented by a following formula (III), contents (mol %) of a, b, and c based on the total monomer units that satisfy following formulae (1) through (3), and a degree of saponification (DS) defined by a following formula (4) is not less than about 90 mol %.

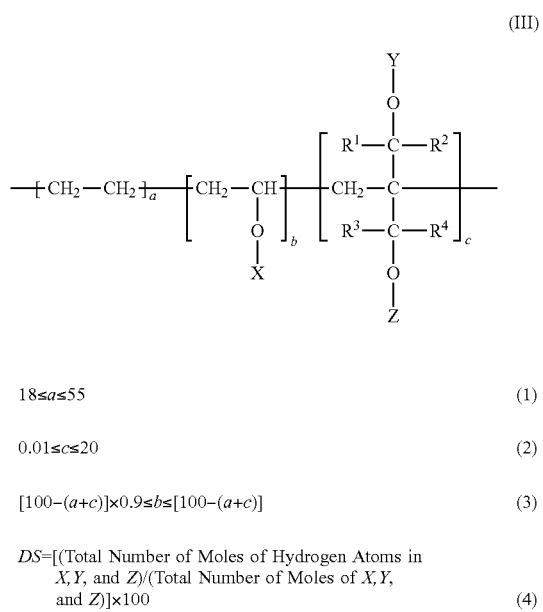

(III)

$18 \leq a \leq 55$ (1)

$0.01 \leq c \leq 20$ (2)

$[100-(a+c)] \times 0.9 \leq b \leq [100-(a+c)]$ (3)

$DS$=[(Total Number of Moles of Hydrogen Atoms in $X, Y,$ and $Z$)/(Total Number of Moles of $X, Y,$ and $Z$)]×100 (4)

In the formula (III), each of $R^1$, $R^2$, $R^3$ and $R^4$ independently denotes a hydrogen atom or an alkyl group having a carbon number of from 1 to 10, and the alkyl group may include a hydroxyl group, an alkoxy group, or a halogen atom. Each of X, Y, and Z independently denotes a hydrogen atom, a formyl group, or an alkanoyl group having a carbon number of from 2 to 10.

The EVOH may also contain, as a copolymer unit, a small amount of another monomer unit other than the ethylene unit and the vinyl alcohol unit within a range not to inhibit the purpose of the present invention. Examples of such a monomer include α-olefins such as propylene, 1-butene, isobutene, 4-methyl-1-pentene, 1-hexene, and 1-octene; unsaturated carboxylic acids such as itaconic acid, methacrylic acid, acrylic acid, and maleic acid, salts thereof, partial or complete esters thereof, nitriles thereof, amides thereof, and anhydrides thereof; vinylsilane compounds such as vinyltrimethoxysilane, vinyltriethoxysilane, vinyltri (2-methoxyethoxy)silane, and γ-methacryloxypropyltrimethoxysilane; unsaturated sulfonic acids or salts thereof; unsaturated thiols; and vinylpyrrolidones.

Polyolefin (B)

Examples of suitable polyolefin resins include polyethylenes such as linear low-density polyethylenes, low-density polyethylenes, ultra-low-density polyethylenes, ultra-low-density linear polyethylenes, medium-density polyethylenes, and high-density polyethylenes; polyethylene copolymer resins such as ethylene-α-olefin copolymers; polypropylene resins such as polypropylenes, ethylene-propylene (block and random) copolymers, and propylene-α-olefin (C4-20 α-olefin) copolymers; polybutenes; polypentenes; graft polyolefins obtained by graft modification of these polyolefins with an unsaturated carboxylic acid or an ester thereof; cyclic polyolefin resins; ionomers; an ethylene-vinyl acetate copolymer; an ethylene-acrylic acid copolymer; an ethylene-acrylic acid ester copolymer. In terms of mechanical strength and molding processability, polyethylenes and polypropylenes are particularly preferable among these.

The Polyolefin (B) typically has, as a lower limit of a melt flow rate at 190° C. (a measured value at a load of 2160 g in accordance with JIS K 7210), a melt flow rate of about 0.1, 0.2, 0.3, 0.4, 0.5, 0.6, 0.7, 0.9, 1.0 g/10 min or more. On the other hand, the Polyolefin (B) typically has, as an upper limit of a melt flow rate, a melt flow rate of about 50, 45, 40, 35, 30, 25, 20, 15 g/10 min or less.

Acid-Modified Ethylene-α-Olefin Copolymer (C)

The acid-modified ethylene-α-olefin copolymer (C) disclosed herein is obtained by copolymerization in which part of monomers constituting an ethylene-α-olefin copolymer is substituted by α,β-unsaturated carboxylic acid or anhydride monomers thereof or by introducing α,β-unsaturated carboxylic acid or an anhydride thereof to part of side chains by graft reaction, such as radical addition.

Examples of suitable α,β-unsaturated carboxylic acids or an anhydrides thereof used in the above acid modification include maleic acid, acrylic acid, itaconic acid, crotonic acid, maleic anhydride, itaconic anhydride, or a mixture thereof. In some embodiments, maleic anhydride is preferred.

Examples of the ethylene-α-olefin copolymer disclosed herein may include those with a backbone containing 1 to 3 different α-olefin monomers (beside the ethylene monomer), in one embodiment 1 to 3 different α-olefin monomers and in yet another embodiment 1 α-olefin monomer in addition to the ethylene monomer. The α-olefin monomers include 3 to 20, and in other embodiments 3 to 12, or 3 to 10, or 3 to 6, or 3 to 4 carbon atoms, and in another embodiment 3 carbon atoms (i.e., propylene). Examples of suitable α-olefin monomers include propylene, 1-butene, 1-hexene, 1-octene, 4-methyl-1-pentene, 1-decene, 1-dodecene, 1-tridecene, 1-tetradecene, 1-pentadecene, 1-hexadecene, 1-heptadecene, 1-octadecene, 1-nonadecene or mixtures thereof. The α-olefin monomer may be 1-butene, propylene or mixtures thereof. Examples of ethylene-α-olefin copolymers include ethylene-propylene copolymers, ethylene-butene copolymers, and mixtures thereof.

The acid-modified ethylene-α-olefin copolymer (C) may have, as a lower limit of a melt flow rate at 190° C. (a measured value at a load of 2160 g in accordance with JIS K 7210), a melt flow rate of about 0.1, 0.2, 0.3, 0.4, 0.5, 0.6, 0.7, 0.8, 0.9, 1.0 g/10 min or more. On the other hand, the acid-modified ethylene-α-olefin copolymer (C) may have, as an upper limit of a melt flow rate, a melt flow rate of about 50, 45, 40, 35, 30, 25, 20, 15 g/10 min or less.

The acid modified ethylene-α-olefin copolymer (C) desirably has an acid value of about 50, 45, 40, 35, 30, 25, 20 mg KOH/g or less. If the acid value is higher than the range, reaction points with hydroxyl groups in the EVOH (A) are so increased that high polymers are formed in the course of melt kneading, leading to reduction in stability during extrusion and tendency not to easily produce a good multilayer article. In contrast, if the acid value is lower, compatibility with the EVOH (A) is reduced, leading to tendency to increase the amount of the resin adhered to the die (die build-up). The lower limit of the acid value is thus desirably about 1 mg KOH/g or more, or about 2 mg KOH/g or more.

The acid modified ethylene-α-olefin copolymer (C) desirably has a density of about 0.9 g/cm³ or less, or about 0.89 g/cm³ or less, or about 0.88 g/cm³ or less. The use of such low-density acid-modified ethylene-α-olefin copolymer (C) enables production of a multilayer article and a multilayer structure particularly excellent in tear strength. In one embodiment, the acid modified ethylene-α-olefin copolymer (C) has a density of about 0.85 g/cm³ or more.

In the resin composition of the present invention, the acid-modified ethylene-α-olefin copolymer (C) is considered to have high compatibility with the EVOH (A) and also functions as a compatibilizer for the EVOH (A) and the polyolefin resins (B). By reaction of the acid-modified ethylene-α-olefin copolymer (C) with the hydroxyl groups in the EVOH (A) while the resin composition is kneaded in a twin screw extruder for preparation, a graft polymer of the EVOH (A) and the acid-modified ethylene-α-olefin copolymer (C) is produced. Such graft polymer has compatibility with the EVOH (A) and further exhibits a compatibility effect with the EVOH (A) and the polyolefin resins (B). This causes microdispersion of the polyolefin resins (B) in the EVOH (A) to improve the stability of the resin composition during extrusion and also improve the tear strength of a multilayer article produced using the resin composition.

Other Components

The resin composition of the present disclosure may contain another component within a range not to impair the effects of the present invention. Examples of the other component include a boron compound, an alkali metal salt, a phosphoric acid compound, an oxidizable substance, another polymer, an oxidization accelerator, and another additive.

<Boron Compound>

Addition of a boron compound to the resin composition of the present disclosure may be advantageous in terms of improving melt viscosity of the EVOH and obtaining a homogenous coextrusion molded product or a coinjection molded product. Examples of the boron compound include boric acids, a boric acid ester, a boric acid salt, and boron hydrides. Specific examples of the boric acids include orthoboric acid (hereinafter, also merely referred to as "boric acid"), metaboric acid, and tetraboric acid. Specific examples of the boric acid ester include triethyl borate and trimethyl borate. Specific examples of the boric acid salt include alkali metal salts and alkaline earth metal salts of the above various types of boric acids, and borax. Among these compounds, orthoboric acid is preferred.

When a boron compound is added, the content of the boron compound in the composition is typically from about 20 ppm, or from about 50 ppm, to about 2000 ppm, or to about 1500 ppm, in terms of the boron element equivalent. The content of the boron compound in this range can give EVOH that is produced while torque variation is suppressed during heat melting.

<Alkali Metal Salt>

The EVOH resin composition may also contain an alkali metal salt in an amount of from about 5 ppm, or from about 20 ppm, or from about 30 ppm, to about 5000 ppm, or to about 1000 ppm, or to about 500 ppm, in terms of the alkali metal element equivalent. The resin composition containing an alkali metal salt in the above range can improve the interlayer adhesiveness and the compatibility. An alkali metal is exemplified by, for example, lithium, sodium, and potassium, and the alkali metal salt is exemplified by, for example, an aliphatic carboxylic acid salt, an aromatic carboxylic acid salt, a phosphoric acid salt, and a metal complex of the alkali metal. Examples of the alkali metal salt include sodium acetate, potassium acetate, sodium phosphate, lithium phosphate, sodium stearate, potassium stearate, and sodium salts of ethylene diamine tetraacetic acid. Especially, sodium acetate, potassium acetate, and sodium phosphate are preferred.

<Phosphoric Acid Compound>

The EVOH resin composition may also contain a phosphoric acid compound in an amount of from about 1 ppm, or from about 5 ppm, or from about 10 ppm, to about 500 ppm, or to about 300 ppm, or to about 200 ppm, in terms of the phosphate radical equivalent. Blending the phosphoric acid compound in the above range can improve the thermal stability of the EVOH and suppress, in particular, generation of gel-state granules and coloring during melt molding for a long period of time.

The type of the phosphoric acid compound added to the EVOH resin composition is not particularly limited, and there can be used, for example, various types of acids such as phosphoric acid and phosphorous acid, and salts thereof. The phosphoric acid salt may be any form of a primary phosphoric acid salt, a secondary phosphoric acid salt, and a tertiary phosphoric acid salt. Although the cation species of the phosphoric acid salt is not also particularly limited, an alkali metal or an alkaline earth metal is preferred as the cation species. Especially, the phosphorus compound is preferably added in the form of sodium dihydrogen phosphate, potassium dihydrogen phosphate, disodium hydrogen phosphate or dipotassium hydrogen phosphate.

<Other Additives>

The resin composition of the present disclosure may contain various types of additives within a range not to impair the effects of the present disclosure. Examples of such additives include an antioxidant, a plasticizer, a heat stabilizer (melt stabilizer), a photoinitiator, a deodorizer, an ultraviolet ray absorber, an antistatic agent, a lubricant, a colorant, a filler, a drying agent, a bulking agent, a pigment, a dye, a processing aid, a fire retardant, and an anti-fogging agent.

Mass Ratio of (A), (B), and (C)

In the resin composition of the present disclosure, a mass ratio [(A)/((B)+(C))] of an amount of the EVOH (A) to a total amount of the polyolefin resins (B) and the acid modified ethylene-α-olefin copolymer (C) is, from the perspective of both bubble stability during extrusion and mechanical resistance during filling, storing and unloading of the grain, is generally more than about 60/40 and less than 80/20. The mass ratio [(A)/((B)+(C))] may be from about 1.6, 1.7, 1.8, 1.9, 2.0, 2.1, 2.2, 2.3, 2.4, or 2.5 to about 3.9, 3.8, 3.7, 3.6, 3.5, 3.4, 3.3, 3.2, 3.1, 3.0, 2.9, 2.8, 2.7, 2.6, or 2.5. In some embodiments, the mass ratio [(A)/((B)+(C))] is more than about 1.5 and less than about 4.0, preferably from about 1.6 to about 3.9, preferably from about 1.7 to about 3.5, and preferably from about 1.8 to 3.0. If the mass ratio [(A)/((B)+(C))] is more than the upper limit disclosed herein, the resin composition show high barrier properties which is not suitable for cheese packaging, for example. In some embodiments, the mass ratio is about 76/24 or less, or about 75/25 or less. In contrast, if the mass ratio [(A)/((B)+(C))] is less than the lower limit disclosed herein, barrier properties of the resin composition may become unstable. In some embodiments, the mass ratio is about 64/36 or more, or about 65/35 or more.

Preparation of Resin Composition and Gas Permeable Film

A method of preparing the resin composition and the gas permeable film of the present disclosure is not particularly limited. Examples include, for example, a ribbon blender, a high-speed mixer-co-kneader, a mixing roll, an extruder (single screw or twin screw extruder, etc.), an intensive mixer, and the like. Among them, a method using a single screw or twin screw extruder is preferred. A temperature of melt compounding is appropriately selected, depending on the type and the molecular weight of resin to be used, a blending ratio of the composition, the type of extruder, and the like, and it is generally within the range of from about 170 to about 350° C.

When melt compounding is conducted using an extruder, it is preferred to use an extruder with a high degree of kneading, to seal a hopper port with nitrogen, and to extrude at a low temperature. This enables homogenization of the dispersed state and prevention of gelation or generation and contamination of foreign materials.

The gas permeable film is prepared using the resin composition described herein. In some embodiments, the resin composition and/or the gas permeable film comprising the resin composition has a matrix and domain structure. The matrix refers to a continuous phase, and the domain refers to a dispersive phase in the resin composition or the gas permeable film. In some embodiments, the matrix comprises the ethylene-vinyl alcohol copolymer (A), and the domain comprises the polyolefin (B) and the acid-modified ethylene-α-olefin copolymer (C).

The thickness of the gas permeable film described herein is not particularly limited, but is typically from about 2, 3, 4, 5, 6, 7, 8, 9 or 10 μm, to about 30, 29, 28, 27, 26, 25, 24, 23, 22, 21, 20, 19, 18, 17, 16, 15, 14, 13, 12, 11 or 10 μm. In some embodiments, a thickness of the gas permeable film is preferably from about 2 μm to about 30 μm, preferably from about 3 μm to about 15 μm, or preferably from about 3 μm to about 5 μm. It may be difficult to produce even gas permeable film thickness if the gas permeable film thickness is less than 2 μm.

X and Y Value of Gas Permeable Film

X value of the gas permeable film described herein is calculated by formula (a):

$$X = [1/(100-R)] \times T \times 100 \quad (a),$$

in which R is the mass ratio [(A)/((B)+(C))] of the ethylene-vinyl alcohol copolymer (A) to a total amount of the unmodified polyolefin (B) and the acid modified ethylene-α-olefin copolymer (C), and T is a thickness of said gas permeable film. In one aspect, X value of the gas permeable film described herein is from about 7.6 to about 14.9. In another aspect, the X value may be more than about 7.5 and less than about 15, preferably from about 7.8 to about 14.8, or preferably from about 8 to about 15. In another aspect, X value of the gas permeable film described herein is from about 7.5, 7.6, 7.7, 7.8, 7.9, 8.0, 8.1, 8.2, 8.3, 8.4, 8.5, or 8.6 to about 14.3, 14.4, 14.5, 14.6, 14.7, 14.8, or 14.9. The gas permeable film having the X value within the disclosed range may be stable and give proper medium barrier properties. In additional embodiments, an ethylene content of the ethylene-vinyl alcohol copolymer in the gas permeable film is at least 45 mol %, preferably from 46 mol % to 55 mol %, preferably from 47 to 49 mol %, and preferably 48 mol %.

Y value of the gas permeable film described herein is calculated by formula (b):

$$Y = X/(0.001 \times EXP(0.16 \times E)) \quad (b),$$

in which E is ethylene content (mol %) of the ethylene-vinyl alcohol copolymer. In one aspect, Y value of the gas permeable film described herein is from about 3.6 to about 6.8. In another aspect, the Y value may be more than about 3.5 and less than about 6.9, preferably from about 3.6 to about 6.8, preferably from about 3.0 to about 6.8, or preferably from about 4.0 to about 6.6. In another aspect, Y value of the gas permeable film described herein is from about 3.6, 3.7, 3.8, 3.9, or 4.0 to about 6.6, 6.7, or 6.8. The gas permeable film having the Y value within the disclosed range may be stable, give proper medium barrier properties and recyclability.

Multilayer Articles

A multilayer article having the gas permeable layer described herein shows medium barrier properties and excellent recyclability which is suitable for the packaging of cheese, for example.

Structure of Multilayer Article

The layer structure of the multilayer article of the present disclosure is not particularly limited. In one aspect, the multilayer article comprises E, AD, and T, and where E represents a layer obtained from the EVOH resin composition of the present disclosure, AD represents a layer obtained from an adhesive resin, and T represents a layer obtained from a hydrophobic thermoplastic, and the following layer structures are exemplarily mentioned.

Adhesive Layer

As indicated above, the multilayer article in accordance with the present disclosure may contain at least one adhesive layer based. Suitable adhesive layers are generally known to those of ordinary skill in the art based on the two layers being adhered.

In one embodiment, the adhesive layer(s) is an acid-functionalized polymer resin composition. For adhesion between the layer of the EVOH resin composition (EVOH resin composition layer) and the layer of the hydrophobic thermoplastic resin composition, an adhesive resin layer is typically interposed between these layers. Typical examples of the adhesive resin include carboxyl group-containing modified polyolefin resins obtained by chemically binding an unsaturated carboxylic acid or an anhydride thereof to a polyolefin resin. Specific examples of the adhesive resin include polyethylenes modified with maleic anhydride, polypropylenes modified with maleic anhydride, a maleic anhydride-modified ethylene-ethyl acrylate copolymer, and a maleic anhydride-graft-modified ethylene-vinyl acetate copolymer. In terms of mechanical strength and molding processability, polyethylenes modified with maleic anhydride and polypropylenes modified with maleic anhydride are preferable, and polyethylenes modified with maleic anhydride are particularly preferable among these.

Regarding the melt viscosity of the adhesive resin, the MFR at 190° C. and a 2160-g load typically has a lower limit of about 0.1 g/10 minutes, or about 0.2 g/10 minutes, and typically has an upper limit of about 100 g/10 minutes, or about 60 g/10 minutes. The difference between the MFR of the adhesive resin and the MFR of the EVOH resin composition is preferably small. When the melt viscosity of the adhesive resin is as described above, an excellent multilayer article having excellent adhesive strength without any layer turbulence can be obtained.

Other Layers

Other constituent layers of the multilayer articles of the present disclosure, which are not the layers of the EVOH resin composition and the adhesive resin composition, are not particularly limited. In terms of recyclability, polyolefin based resin is preferable.

In order to avoid moisture, which can reduce the barrier property of the EVOH resin composition, the resin contained in other constituent layer is typically a hydrophobic thermoplastic resin composition comprising, as a predominant portion, one or more hydrophobic thermoplastic resins. Examples of suitable hydrophobic thermoplastic resins include polyolefin resins; polyethylenes such as linear low-density polyethylenes, low-density polyethylenes, ultra-low-density polyethylenes, ultra-low-density linear polyethylenes, medium-density polyethylenes, and high-density polyethylenes; polyethylene copolymer resins such as ethylene-α-olefin copolymers; polypropylene resins such as polypropylenes, ethylene-propylene (block and random)

copolymers, and propylene-α-olefin (C4-20 α-olefin) copolymers; polybutenes; polypentenes; graft polyolefins obtained by graft modification of these polyolefins with an unsaturated carboxylic acid or an ester thereof; ionomers; an ethylene-vinyl acetate copolymer; an ethylene-acrylic acid copolymer; an ethylene-acrylic acid ester copolymer. In terms of recyclability, polyolefin resins are preferable, and polyethylenes and polypropylenes are particularly preferable among these.

For the hydrophobic thermoplastic resin composition, a light stabilizer may be added. The content of light stabilizer in the hydrophobic thermoplastic resin is typically from about 0.2% by weight, or about 0.3% by weight, or about 0.5% by weight, to about 1.0% by weight, or to about 8% by weight, or to about 5% by weight, based on the total weight of the hydrophobic thermoplastic resin composition. When the content is less than these ranges, the hydrophobic thermoplastic resin composition tends to be degraded by ultraviolet light. When the content is greater than these ranges, the hydrophobic thermoplastic resin composition has poor mechanical strength.

Regarding the melt viscosity of the hydrophobic thermoplastic resin composition, the MFR at 190° C. and a 2160 g load typically has a lower limit of about 0.1 g/10 minutes, or about 0.2 g/10 minutes, and typically has an upper limit of about 100 g/10 minutes, or about 60 g/10 minutes. The difference between the MFR of the hydrophobic thermoplastic resin composition and the MFR of the EVOH resin composition is preferably small. When the melt viscosity of the hydrophobic thermoplastic resin composition is as described above, an excellent multilayer article without layer unevenness can be obtained.

Alternatively, other functional layers can be incorporated into the multilayer articles, such as the materials provide heat sealability and scuff resistance and toughness.

Multilayer Structure

In one aspect, the multilayer article described herein has a core layer comprising the EVOH resin composition (E). The multilayer article may contain one or more other types of layers, for example, hydrophobic thermoplastic resin composition layers (T) and adhesive layers (AD).

Examples of the layer structure of the multilayer article is shown below.

When the multilayer structure described below is used for a multilayer article, the leftmost layer is the innermost layer, and the rightmost layer is the outermost layer.

Five layers: T/AD/E/AD/T, AD/E/AD/E/AD, T/AD/E/AD/E

Six layers: T/T/AD/E/AD/T, T/AD/E/AD/T/T, AD/E/AD/E/AD/E, T/AD/E/AD/E/AD

Seven layers: T/T/AD/E/AD/T/T, T/AD/E/AD/E/AD/T

Eight layers: T/T/AD/E/AD/T/T/T, T/T/T/AD/E/AD/T/T, T/T/AD/E/AD/E/AD/T T/AD/E/AD/E/AD/T/T Nine layers: T/T/T/AD/E/AD/T/T/T, T/T/AD/E/AD/E/AD/T/T In the multilayer structure of the present disclosure, the polyolefin resin and/or the adhesive resin may be substituted by scrap of the multilayer structure. Moreover, scrap of another polyolefin multilayer article may be mixed and used.

For preventing moisture in order to avoid degrading oxygen barrier property, a structure, in which the EVOH resin composition layer represented as E, may be used as an intermediate layer and the polyolefin layer as T may be used as an outer layer. And, the structures of T/AD/E/AD/T and T/T/AD/E/AD/T/T are preferable among these. T or AD may be the same or different. The EVOH layer does not need to be at the center of the multilayer, and in some embodiments, the two layers on the intermediate EVOH layers may be different.

Regarding the thickness of a multilayer article in accordance with one embodiment of the present disclosure, the total thickness thereof is typically from about 50, 55, 60, 65, 70, 75, 80, 85, 90, 91, 92, 93, 94, 95, 96, 97, 98, 99, 100, 101, 102, 103, 10, 105, 106, 107, 108, 109, 110, 111, 112, 113, 114, 115, 116, 117, 118, 119, or 120 µm to about 500, 490, 480, 470, 460, 450, 440, 430, 420, 410, 400, 390, 380, 370, 360, 350, 340, 330, 320, 310, 300, 290, 280, 270, 260, 250, 240, 230, 220, 210, 200, 190, 180, 170, 160, 150, 140, 130, 120, 110, 100, or 95 µm. In some embodiments, the total thickness is preferably from about 50 µm to about 400 µm, preferably from about 80 µm to about 200 µm, or preferably from about 80 µm to about 100 µm.

The thickness of each T layer in the film is not particularly limited, but is typically from about 20, 25, 30, 35, 40, 45, or 50 µm to about 250, 240, 230, 220, 210, 200, 190, 180, 170, 160, or 150 µm. In some embodiments, the thickness of each T layer in the film is preferably from about 20 µm to about 250 µm, preferably from about 30 µm to about 100 µm, or preferably from about 30 µm to about 50 µm.

The thickness of each AD layer in the film is not particularly limited, but is typically from about 2.0, 2.5, 3.0, 3.5, 4.5, or 5.0 µm to about 30, 29, 28, 27, 26, 25, 24, 23, 22, 21, 20, 19, 18, 16, 15, 14, 13, 12, 11, 10, 9, 8, 7, 6 or 5 µm. In some embodiments, the thickness of each AD layer in the film is preferably from about 2.0 µm to about 30 µm, preferably from about 3 µm to about 10 µm, or preferably from about 4 µm to about 8 µm.

The thickness of each EVOH resin composition layer in the multilayer article is not particularly limited, but is typically from about 2, 3, 4, 5, 6, 7, 8, 9 or 10 µm, to about 30, 29, 28, 27, 26, 25, 24, 23, 22, 21, 20, 19, 18, 17, 16, 15, 14, 13, 12, 11 or 10 µm. In some embodiments, the thickness of each EVOH resin composition layer in the film is preferably from about 2 µm to about 30 µm, preferably from about 3 µm to about 6 µm, or preferably from about 3 µm to about 5 µm. It may be difficult to produce a multilayer article having even EVOH thickness if EVOH layer thickness is less than 2 µm.

Preparation of Multilayer Structure

A method of producing the multilayer structure of the present invention is not particularly limited. Examples include a method in which a thermoplastic resin is melt extruded on a multilayer article (film, sheet, and the like) comprising the gas permeable film and adhesive layer of the present disclosure, a method in which the resin composition and another thermoplastic resin are coextruded, a method in which a multilayer article formed from the resin composition and a film or a sheet of another substrate are laminated using a known adhesive, such as an organic titanium compound, an isocyanate compound, and a polyester-based compound, and the like.

Examples of the forming machine to produce the multilayer article include, for example, a cast co-extrusion machine, a blown co-extrusion machine, a extrusion coating machine, and the like. Specific examples of the multilayer article include a film, a sheet and the like. The extrusion temperature for forming is appropriately selected depending on the type of resin to be used, a molecular weight, a blending ratio of the composition, the type of forming machine, and the like, and is generally within the range of from about 170° C. to about 350° C.

Barrier Properties

Typically, resins having oxygen permeability less than 10 cc·20 μm/m$^2$·day·atm at 20° C./65% RH such as EVOH and Polyvinylidene Chloride (PVdC) are classified as high barrier resins. Resins having oxygen permeability of 10-100 cc·20 μm/m$^2$·day·atm at 20° C./65% RH such as Polyamide 6 and Polyethylene terephthalate (PET) are classified as medium barrier resins. Resins having oxygen permeability greater than 100 cc. 20 μm/m$^2$·day·atm at 20° C./65% RH such as Polyolefin and elastomers are classified as low barrier resins. Low OTR value is typically preferred to extend shelf life of foods by preventing oxidation. However, some food like cheese requires to respire some extend. Such kind of foods requires medium barrier packaging.

Oxygen permeability at 20° C./65% RH of the gas permeable film described herein may be about 10, 11, 12, 13, 14, 15, 16, or 17 cc·20 μm/m$^2$·day·atm or more, and about 100, 90, 80, 70, 60, 50, 40, 30, 20 cc·20 μm/m$^2$·day·atm or less. Oxygen permeability at 20° C./65% RH of the gas permeable film described herein may preferably be about 10 cc·20 μm/m$^2$·day·atm or more, and about 100 cc·20 μm/m$^2$·day·atm or less, preferably be about 10 cc·20 μm/m$^2$·day·atm or more, and about 50 cc·20 μm/m$^2$·day·atm or less, or preferably be about 10 cc·20 μm/m$^2$·day·atm or more, and about 20 cc·20 μm/m$^2$·day·atm or less.

Carbon dioxide transmission rate (CO2TR) can be measured in accordance with ASTM F2476-13. CO2TR at 20° C./0% RH of the multilayer articles described in this disclosure may be greater than about 200, 205, 210, 215, 220, 225, 230, 235, 240, or 245 cc/m$^2$·day·atm and less than about 600, 590, 580, 570, 560, 550, 540, 530, 520, 510, 500, 490, 480, 470, 460, 450, 440, 430, 420, 410, 400, or 390 cc/m$^2$·day·atm. In some embodiments, CO2TR at 20° C./0% RH of the multilayer articles described in this disclosure may be preferably greater than about 200 cc/m$^2$·day·atm and less than about 600 cc/m$^2$·day·atm, preferably greater than about 200 cc/m$^2$·day·atm and less than about 400 cc/m$^2$·day·atm, or preferably greater than about 240 cc/m$^2$·day·atm and less than about 400 cc/m$^2$·day·atm. If CO2TR of multilayer article is in the range described herein, the film shows good results in shelf life test of cheese, for example. If CO2TR is lower than the range described herein, packaging may inflate during shelf life test of cheese because of carbon dioxide generated from cheese. If CO2TR is higher than the range described herein, OTR becomes high so that cheese may lose taste and flavor quickly because of oxidation.

Oxygen transmission rate (OTR) can be measured in accordance with ASTM D3985-17 or ASTM F1927-14 or ISO21309-2. OTR at 20° C./65% RH of the multilayer articles described in this disclosure may be greater than about 50, 51, 52, 53, 54, 55, 56, 57, 58, 59, 60, 61, 62, 63, 64, 65, 66, 67, 68, 69, 70, 71, 72, 73, 74, or 75 cc/m$^2$·day·atm and less than about 150, 149, 148, 147, 146, 145, 144, 143, 142, 141, 140, 139, 138, 137, 136, 135, 136, 135, 134, 133, 132, 131, 130, 129, 128, 127, 126, 125, 124, 123, 122, 121, 120, 119, 118, or 117 cc/m$^2$·day·atm. In some embodiments, OTR at 20° C./65% RH of the multilayer articles described in this disclosure may be preferably greater than about 50 cc/m$^2$·day·atm and less than about 150 cc/m$^2$·day·atm, preferably greater than about 60 cc/m$^2$·day·atm and less than about 130 cc/m$^2$·day·atm, or preferably greater than about 65 cc/m$^2$·day·atm and less than about 120 cc/m$^2$·day·atm.

X and Y Value of Multilayer Article

X value of a multilayer article having the gas permeable film(s) described herein is defined to be the highest X value out of the X value(s) calculated for the gas permeable film(s) in the multilayer article. When a multilayer article has only one gas permeable film described herein, the X value of the multilayer would be the same as the X value of the gas permeable film. When a multilayer article has multiple gas permeable films, an X value for each of the gas permeable films is to be calculated, and the highest X value becomes the X value of the multilayer article. In one aspect, X value of the multilayer article described herein is from about 7.6 to about 14.9. In another aspect, the X value may be more than about 7.5 and less than about 15, preferably from about 7.8 to about 14.8, or preferably from about 8 to about 15. In another aspect, X value of the gas permeable film described herein is from about 7.6, 7.7, 7.8, 7.9, 8.0, 8.1, 8.2, 8.3, 8.4, 8.5, or 8.6 to about 14.3, 14.4, 14.5, 14.6, 14.7, 14.8, or 14.9. The multilayer article having the X value within the disclosed range may be stable and give proper medium barrier properties. In additional embodiments, an average ethylene content of the ethylene-vinyl alcohol copolymer (A) in all gas permeable film(s) in multilayer article is at least 45 mol %, preferably from 46 mol % to 55 mol %, preferably from 47 to 49 mol %, and preferably 48 mol %. In additional embodiments, a carbon dioxide transmission rate (CO2TR) of the multilayer article at 20 degC/0% RH in accordance with ASTM F2476-13 is greater than 200 cc/m$^2$·day·atm and less than 600 cc/m$^2$·day·atm. In additional embodiments, an oxygen transmission rate (OTR) of the multilayer article at 20 degC/65% RH in accordance with ASTM F1927-14 is greater than 50 cc/m$^2$·day·atm and less than 150 cc/m$^2$·day·atm.

Y value of the multilayer article described herein is defined to be the highest Y value out of all Y value(s) calculated for the gas permeable film(s) in the multilayer article. When a multilayer article has only one gas permeable film described herein, the Y value of the multilayer would be the same as the Y value of the gas permeable film. When a multilayer article has multiple gas permeable films, an Y value for each of the gas permeable films is to be calculated, and the highest Y value becomes the Y value of the multilayer article. In one aspect, Y value of the multilayer article described herein is from about 3.6 to about 6.8. In another aspect, the Y value may be more than about 3.5 and less than about 6.9, preferably from about 3.6 to about 6.8, preferably from about 3.0 to about 6.8, or preferably from about 4.0 to about 6.6. In another aspect, Y value of the multilayer article described herein is from about 3.6, 3.7, 3.8, 3.9, or 4.0 to about 6.6, 6.7, or 6.8. The multilayer article having the Y value within the disclosed range may be stable, give proper medium barrier properties and recyclability.

Recyclability

Most of flexible packaging in industry is comprised of polyolefin such as polyethylene.

When the packaging is recycled, the packaging may be shredded, flaked or chipped prior to cleaning step. Processes and equipment for shredding, flaking, chipping the flexible packaging are well known in the art, as are readily apparent to one of ordinary skill in the art.

The cleaning step may comprise washing, with or without float-separation techniques, the flexible packaging to remove dirt and other volatile and solid impurities. Typically, the flexible packaging is washed in a washing tank in the presence of water and other cleaning additives, such as surfactants, detergents and the like. The cleaned flexible packaging is subjected to be dried to remove residual volatile.

After drying, the clean flexible packaging is extruded into pellets using a single screw or a twin screw extruder. Processes and equipment are well known in the art, as will be readily apparent to one of ordinary skill in the art. Typical extrusion temperature was around 200° C.

If material does not affect process instability in the recycling process and gels in final product from recycled material, the material is considered as recyclable from material point of view. Polyamide and Polyethylene terephthalate are not preferred in the recycling process due to high melting point and low compatibility with polyolefin. Polyvinylidene chloride is not preferred due to low thermal stability.

In one aspect, the present disclosure relates to a gas permeable film comprising an ethylene-vinyl alcohol copolymer (A), a polyolefin (B), and an acid-modified ethylene-α-olefin copolymer (C), wherein a mass ratio [(A)/((B)+(C))] of the ethylene-vinyl alcohol copolymer (A) to a total amount of the unmodified polyolefin (B) and the acid modified ethylene-α-olefin copolymer (C) is from 1.6 to 3.9; and the gas permeable film has Y value from 3.6 to 6.8. In another aspect, the present disclosure relates to a gas permeable film comprising an ethylene-vinyl alcohol copolymer (A), a polyolefin (B), and an acid-modified ethylene-α-olefin copolymer (C), wherein a mass ratio [(A)/((B)+(C))] of the ethylene-vinyl alcohol copolymer (A) to a total amount of the unmodified polyolefin (B) and the acid modified ethylene-α-olefin copolymer (C) is from 1.6 to 3.9; the gas permeable film has X value from 7.6 to 14.9; and an ethylene content of the ethylene-vinyl alcohol copolymer (A) in the gas permeable film is from 45 mol % to 50 mol %.

In one aspect, the present disclosure relates to a multilayer article comprising a gas permeable film comprising an ethylene-vinyl alcohol copolymer (A), a polyolefin (B), and an acid-modified ethylene-α-olefin copolymer (C), wherein a mass ratio [(A)/((B)+(C))] of the ethylene-vinyl alcohol copolymer (A) to a total amount of the unmodified polyolefin (B) and the acid modified ethylene-α-olefin copolymer (C) is from 1.6 to 3.9, the multilayer article has Y value from 3.6 to 6.8.

EXAMPLES

The present invention is more specifically described by way of examples. The scope of the present invention, however, is not limited to these examples.
Materials
E layers:
EVOH-48 (EVAL™ G176B, Kuraray America, Inc., Houston, Tex. USA (Ethylene Content: 48 mol %, Saponification degree 99.9%, MFR=6.5 g/10 min))
EVOH-44 (EVAL™ E105B, Kuraray America, Inc., Houston, Tex. USA (Ethylene Content: 44 mol %, Saponification degree 99.9%, MFR=5.5 g/10 min))
PA6 (Ultramid® B36 01, BASF Corporation, Florham Park, N.J., USA)
PA 6, 66 (Ultramid® C40, BASF Corporation, Florham Park, N.J., USA)
mLLDPE (Linear low density polyethylene) (Exceed™ 1018MA, EXXONMOBIL CHEMICAL COMPANY, Spring, Tex., USA)
MAh-EB (Maleic anhydride modified ethylene-butene copolymer) (TAFMER™ MH7020, Mitsui Chemicals America. Inc., Rye Brook, N.Y. USA)
AD layer: MAh-LLDPE (Maleic anhydride modified polyethylene) (ADMER™ NF498E, Mitsui Chemicals America. Inc., Rye Brook, N.Y. USA)
T layer: LLDPE (Linear low density polyethylene) (Sclair® FP120-A, NOVA Chemicals Corporate, Calgary, Alberta Canada)

Example 1

75 parts by mass of EVOH-48, 20 parts by mass of mLLDPE and 5 parts by mass of Mah-EB were blended. The resulting blend was subjected to melt compounding, pelletizing and drying under the following conditions, and then the resin composition B1 was obtained.
Apparatus: 30 mmD twin screw extruder (TEX-30α manufactured by The Japan Steel Works, Ltd.)
L/D: 45 Screw: co-rotating full-intermeshing type
Number of die holes: 4 holes (3 mmD)
Extrusion temperature (° C.): C2=180, C3=200, C4-C13=230, Die=230
Rotation speed: 200 rpm
Output: about 20 kg/hr
Drying: hot air drying at 80° C. for 6 hr
Preparation of Monolayer Film
The resulting resin composition was formed into a monolayer EVOH film (B1) under the following conditions.
Apparatus: 30 mmD single screw extruder (OCS cast film line manufactured by Optical Control System GmbH)
L/D: 26.9
Screw: full flight type, Compression ratio 3:1
Die: 300 mm width
Extrusion temperature (° C.): Z1=180 Z2 to Z9=220
Screen mesh: None
Temperature of cooling roll: 40° C.
Screw rotation speed: 30 rpm
Drawing speed: 3.5 m/minute
Film thickness 20 μm
Defect detector: FSA100
Oxygen Transmission Rate of Monolayer Film
The obtained monolayer film was conditioned at 20° C./65% RH. In accordance with ISO21309-2, oxygen permeability of the film was measured by using an oxygen permeability measuring device (OX-TRAN 2/21 produced by MOCON, Inc.) at 20° C./65% RH. The result is shown in Table 1.
Preparing Co-Extruded multilayer Film
The multilayer film was prepared under the following conditions, followed by trimming two side of layflat into two films.
Conditions for Film Formation
Apparatus: a 7-material-7-layer blown film extruder (Brampton Engineering, Brampton, Ontario Canada)
Extruder
Extruder A: 45-mmφ single screw extruder (L/D=24)
Extruder B: 30-mmφ single screw extruder (L/D=24)
Extruder C: 30-mmφ single screw extruder (L/D=24),
Extruder D: 30-mmφ single screw extruder (L/D=20)
Extruder E: 30-mmφ single screw extruder (L/D=24)
Extruder F: 30-mmφ single screw extruder (L/D=24)
Extruder G: 45-mmφ single screw extruder (L/D=24)
Film structure: A/B/C/D/E/F/G
Die: 150 mm D
Temperature Setting (° C.):
Extruder A: C1/C2/C3/A=193/227/216/221
Extruder B: C1/C2/C3/A=193/227/216/221
Extruder C: C1/C2/C3/A=193/227/216/221
Extruder D: C1/C2/C3/A=193/227/216/221
Extruder E: C1/C2/C3/A=193/227/216/221
Extruder F: C1/C2/C3/A=193/227/216/221
Extruder G: C1/C2/C3/A=193/227/216/221

Die: 221
Material and Thickness Setting

Thickness of each layer were controlled with gravimetric feeders, density of each resins, blow up ratio and draw speed.

Extruder A: T; LLDPE, 30 μm
Extruder B: T; LLDPE, 10 μm
Extruder C: AD; MAh-LLDPE, 5 μm
Extruder D: E; B1, 3 μm
Extruder E: AD; MAh-LLDPE, 5 μm
Extruder F: T; LLDPE, 10 μm
Extruder G: T; LLDPE, 30 μm Layer Structure T from extruder (A and B) and (F and G) were unified to be one layer. Multilayer film having 3-material-5-layer (T/AD/E/AD/T) was obtained.

Measuring of Thickness of the Multilayer Film

The thickness of each layer in the multilayer film was measured by following procedure and summarized in Table 2.

Samples were collected from center of width at the beginning of film preparation. Collected sample was cut by knife and sliced using a microtome (RM2165 manufactured by Leica). Layer thickness was measured using an optical microscope (Model: Eclipse ME600 optical microscope manufactured by Nikon). Film thickness is shown in below and in Table 2.

Total thickness: 91 μm
LLDPE/MAh-LLDPE/B1/MAh-LLDPE/LLDPE=41/4/3/5/38

Film Quality

Film quality was evaluated with thickness deviation of E layer thickness under criteria below for 5 measurements obtained from left end to right end of the film in even length. Thickness was measure by following procedure.

Samples were collected from 5 area (Left, Between Left and Center, Center, Between Center and Right, Right) at the beginning of film preparation. Collected sample was cut by knife and sliced using a microtome (RM2165 manufactured by Leica). Layer thickness was measured using an optical microscope (Model: Eclipse ME600 optical microscope manufactured by Nikon).

Evaluation criteria (A is good, B is moderate, C is bad)
A: Thickness of E layer was even. Coefficient of variation is below 15%.
B: Thickness of E layer had some unevenness. Coefficient of variation is 15%-30%.
C: Thickness of E layer was uneven. Coefficient of variation is more than 30%.

Oxygen Transmission Rate

The obtained multilayer film was conditioned at 20° C./65% RH. In accordance with ASTM F1927-14, oxygen transmission rate (OTR) of the film was measured by using an oxygen permeability measuring device (OX-TRAN 2/21 produced by MOCON, Inc.) at 20° C./65% RH. The result is shown in Table 2.

Carbon Dioxide Transmission Rate

The obtained multilayer film was dried in a vacuum oven (DP63 produced by Yamato Scientific Co., ltd.) at 40° C. under 0.1 MPaG for 7 days. In accordance with ASTM F2476-13, carbon dioxide transmission rate (CO2TR) of the film was measured by using an carbon dioxide permeability measuring device (PERMATRAN-C 4/41 produced by MOCON, Inc.) at 20° C./0% RH. The result is shown in Table 2.

Recyclability

In order to demonstrate recyclability of the multilayer structure, model testing was conducted.

3 parts by mass of B1, 10 parts by mass of MAh-LLDPE and 80 parts by mass of LLDPE which was similar ratio as LLDPE/MAh-LLDPE/B1/MAh-LLDPE/LLDPE=40/5/3/5/40 were blended. The resulting blend was subjected to melt compounding and pelletizing under the following conditions. Buildup the on die lip (so called die build up or die drool) was collected during 10 kg operation. Weight of die build up was measured as an index of bad recyclability which affect process instability and gels in the recycling process. Recyclability was evaluated with criteria below. The result is shown in Table 2.

Apparatus: 25 mmD twin screw extruder (Labo Plastomill: 50C150, Twin screw extruder unit: 2D25W manufactured by Toyo Seiki Seisaku-sho, Ltd.)
Co-rotating full-intermeshing type
L/D: 25
Number of die holes: 2 holes (3 mmD)
Extrusion temperature (° C.): C1=180, C2=200, C3-05=230, Die=230
Rotation speed: 100 rpm
Output: about 6 kg/hr
Evaluation criteria (A is good, B is moderate, C is bad)
A: Weight of die build up is less than 15 mg
B: Weight of die build up is between 15 mg and 30 mg
C: Weight of die build up is greater than 30 mg Storage Test of Cheese The multilayer film were cut into 12 cm square shape. Three edges of two cut films were heat sealed with 1 cm width to be three side sealed bag. Swiss cheese block (Commercially available from Tillamook) was cut into 7 cm×7 cm×2 cm. The cheese block was put into the sealed bag and the open edge was heat sealed with removing air in the bag. Five bags were prepared for replicates. The bags were placed in 5° C. refrigerator for 60 days. If the CO2TR is too low, the bags is inflated with carbon dioxide generated from the cheese. The results were evaluated with criteria below. The result is shown in Table 2.

Evaluation criteria (A is good, B is moderate, C is bad)
A: Zero or one bag were inflated
B: Two or Three bags were inflated
C: Four or Five bags were inflated Example 2

Example 1 was repeated, except that 75 parts by mass of EVOH-48, 15 parts by mass of mLLDPE and 10 parts by mass of MAh-EB were used to obtain the resin composition B2 and B2 was used to make monolayer film and E layer of the multilayer film.

Evaluation was done in the same manner as Example 1, except that storage test of cheese was not done. The test results are shown in Table 2.

Example 3

Example 1 was repeated, except that 70 parts by mass of EVOH-48, 25 parts by mass of mLLDPE and 5 parts by mass of MAh-EB were used to obtain the resin composition B3 and B3 was used to make monolayer film and E layer of the multilayer film.

Evaluation was done in the same manner as Example 1, except that storage test of cheese was not done. The test results are shown in Table 2.

Example 4

Example 1 was repeated, except that 65 parts by mass of EVOH-48, 30 parts by mass of mLLDPE and 5 parts by mass of MAh-EB were used to obtain the resin composition B4 and B4 was used to make monolayer film and E layer of the multilayer film.

Evaluation was done in the same manner as Example 1. The test results are shown in Table 2.

Example 5

Example 4 was repeated, except that the thickness of the E layer was targeted to be 5

Evaluation was done in the same manner as Example 1, except that storage test of cheese was not done. The test results are shown in Table 2.

Comparative Example 1

PA6 itself was used to make monolayer film and E layer of multilayer film under following conditions.
Preparation of Monolayer Film
PA6 was formed into a monolayer EVOH film (B5) under the following conditions.
Apparatus: 30 mmD single screw extruder (OCS cast film line manufactured by Optical Control System GmbH)
L/D: 26.9
Screw: full flight type, Compression ratio 3:1
Die: 300 mm width
Extrusion temperature (° C.): Z1=180 Z2 to Z9=235
Screen mesh: None
Temperature of cooling roll: 40° C.
Screw rotation speed: 30 rpm
Drawing speed: 3.5 m/minute
Film thickness 20 μm
Defect detector: FSA100
Preparing Co-Extruded Multilayer Film
The multilayer film was prepared under the following conditions, followed by trimming two side of layflat into two films.
Conditions for Film Formation
Apparatus: a 7-material-7-layer blown film extruder (Brampton Engineering, Brampton, Ontario Canada)
Extruder
  Extruder A: 45-mmφ single screw extruder (L/D=24)
  Extruder B: 30-mmφ single screw extruder (L/D=24)
  Extruder C: 30-mmφ single screw extruder (L/D=24),
  Extruder D: 30-mmφ single screw extruder (L/D=20)
  Extruder E: 30-mmφ single screw extruder (L/D=24)
  Extruder F: 30-mmφ single screw extruder (L/D=24)
  Extruder G: 45-mmφ single screw extruder (L/D=24)
  Film structure: A/B/C/D/E/F/G
  Die: 150 mm D
Temperature Setting (° C.):
  Extruder A: C1/C2/C3/A=193/227/216/235
  Extruder B: C1/C2/C3/A=193/227/216/235
  Extruder C: C1/C2/C3/A=193/227/216/235
  Extruder D: C1/C2/C3/A=193/235/235/235
  Extruder E: C1/C2/C3/A=193/227/216/235
  Extruder F: C1/C2/C3/A=193/227/216/235
  Extruder G: C1/C2/C3/A=193/227/216/235
  Die: 235
Material and Thickness Setting
Thickness of each layer were controlled with gravimetric feeders, density of each resins, blow up ratio and draw speed.
  Extruder A: T; LLDPE, 30 μm
  Extruder B: T; LLDPE, 10 μm
  Extruder C: AD; MAh-LLDPE, 5 μm
  Extruder D: E; B1, 15 μm
  Extruder E: AD; MAh-LLDPE, 5 μm
  Extruder F: T; LLDPE, 10 μm
  Extruder G: T; LLDPE, 30 μm
Layer Structure
T from extruder (A and B) and (F and G) were unified to be one layer. Multilayer film having 3-material-5-layer (T/AD/E/AD/T) was obtained.

Evaluation was done in the same manner as Example 1. The test results are shown in Table 2.

Comparative Example 2

Comparative Example 1 was repeated, except that monolayer film and E layer of multilayer film were made with PA 6, 66.

Evaluation was done in the same manner as Example 1, except that storage test of cheese was not done. The test results are shown in Table 2.

Comparative Example 3

EVOH-48 itself was used to make monolayer film and E layer of multilayer film under same condition as Example 1.

Evaluation was done in the same manner as Example 1. The test results are shown in Table 2.

Comparative Example 4

Comparative Example 3 was repeated, except that thickness of E layer was targeted to be 1 μm.

Evaluation was done in the same manner as Example 1, except that recyclability test and storage test of cheese were not done. The test results are shown in Table 2.

Comparative Example 5

Example 1 was repeated, except that 80 parts by mass of EVOH-48, 15 parts by mass of mLLDPE and 5 parts by mass of MAh-EB were used to obtain the resin composition B8 and B8 was used to make monolayer film and E layer of the multilayer film.

The test results are shown in Table 2.

Comparative Example 6

Example 1 was repeated, except that 60 parts by mass of EVOH-48, 35 parts by mass of mLLDPE and 5 parts by mass of MAh-EB were used to obtain the resin composition B9 and B8 was used to make monolayer film and E layer of the multilayer film. And, thickness of E layer was targeted to be 5 μm.

Evaluation was done in the same manner as Example 1, except that recyclability test and storage test of cheese were not done. The test results are shown in Table 2.

Comparative Example 7

Example 1 was repeated, except that 75 parts by mass of EVOH-44, 20 parts by mass of mLLDPE and 5 parts by mass of MAh-EB were used to obtain the resin composition B10 and B10 was used to make monolayer film and E layer of the multilayer film.

Evaluation was done in the same manner as Example 1, except that storage test of cheese was not done. The test results are shown in Table 2.

Comparative Example 8

Example 1 was repeated, except that 70 parts by mass of EVOH-44, 25 parts by mass of mLLDPE and 5 parts by mass of MAh-EB were used to obtain the resin composition B11 and B11 was used to make monolayer film and E layer of the multilayer film.

Evaluation was done in the same manner as Example 1, except that storage test of cheese was not done. The test results are shown in Table 2.

Comparative Example 9

Example 1 was repeated, except that thickness of E layer was targeted to be 5 µm.

Evaluation was done in the same manner as Example 1, except that storage test of cheese was not done. The test results are shown in Table 2.

Comparative Example 10

Example 13 was repeated, except that thickness of E layer was targeted to be 5 µm.

Evaluation was done in the same manner as Example 1. The test results are shown in Table 2.

As shown in Table 2, Example 1 to Example 5 showed both good results on recyclability and storage test for cheese.

On the other hand, Comparative Example 1 and Comparative Example 2 which have polyamide layer as E layer showed not preferred recyclability.

Comparative Example 3 which has EVOH-48 itself as E layer showed not preferred results on storage test of cheese because of too low CO2TR and OTR.

Comparative Example 4 which has EVOH-48 itself as E layer with 1 µm target showed uneven E layer thickness. CO2TR and OTR test were failed because E layer might be too thin at some area.

Comparative Example 5 which has E layer comprising of the resin composition with [(A)/((B)+(C)] being less than 78/22 showed not preferred results on storage test of cheese because of too low CO2TR and OTR.

Comparative Example 6 which has E layer comprising of the resin composition with [(A)/((B)+(C)] being higher than 62/38 showed uneven E layer thickness. CO2TR and OTR test were failed because morphology of the resin composition might be inconsistent.

Comparative Example 7 and Comparative Example 8 which has EVOH-44 as a base resin of the resin composition showed too low CO2TR and OTR indicating not suitable for storage test of cheese.

Comparative Example 9 which thicker E layer than Example 1 showed too low CO2TR and OTR indicating not suitable for storage test of cheese.

Comparative Example 10 which thicker E layer than Example 3 showed not preferred results on storage test of cheese because of too low CO2TR and OTR.

These results explained that Example 1 to Example 5 can be used as a recyclable multilayer film for packaging of cheese.

TABLE 1

| | Composition | | | | | | Oxygen permeability |
|---|---|---|---|---|---|---|---|
| | EVOH or PA | | PE | | MAh-EB | | cc · 20 µm/ |
| | Grade | Weight ratio | Grade | Weight ratio | Grade | Weight ratio | m2 · day · atm 20° C./65% RH |
| B1 | EVOH-48 | 75 | mLLDPE | 20 | MAh-EB | 5 | 11.3 |
| B2 | EVOH-48 | 75 | mLLDPE | 15 | MAh-EB | 10 | 11.6 |
| B3 | EVOH-48 | 70 | mLLDPE | 25 | MAh-EB | 5 | 13.5 |
| B4 | EVOH-48 | 65 | mLLDPE | 30 | MAh-EB | 5 | 17.4 |
| B5 | PA6 | 100 | | | | | 42.7 |
| B6 | PA6,66 | 100 | | | | | 59.8 |
| B7 | EVOH-48 | 100 | | | | | 4.0 |
| B8 | EVOH-48 | 80 | mLLDPE | 15 | MAh-EB | 5 | 7.5 |
| B9 | EVOH-48 | 60 | mLLDPE | 35 | MAh-EB | 5 | 23.4 |
| B10 | EVOH-44 | 75 | mLLDPE | 20 | MAh-EB | 5 | 5.3 |
| B11 | EVOH-44 | 70 | mLLDPE | 25 | MAh-EB | 5 | 6.3 |

TABLE 2

| | Film structure | Measured Thickness (µm) | X value | Y value | Film quality A < B < C | OTR cc/ m² · day · atm 20° C./65% RH | CO2TR cc/ m² · day · atm 20° C./0% RH | Recyclability A > B > C | Storage test Cheese A > B > C |
|---|---|---|---|---|---|---|---|---|---|
| E1 | LLDPE/tie/B1/tie/LLDPE | 41/4/3/5/38 | 12.0 | 5.5 | A | 75.2 | 246.4 | A | A |
| E2 | LLDPE/tie/B2/tie/LLDPE | 40/4/3/4/42 | 12.0 | 5.5 | A | 77.4 | 253.7 | A | — |
| E3 | LLDPE/tie/B3/tie/LLDPE | 41/5/3/4/40 | 10.0 | 4.6 | A | 90.4 | 297.7 | A | — |
| E4 | LLDPE/tie/B4/tie/LLDPE | 41/4/3/5/42 | 8.6 | 4.0 | B | 116.0 | 387.0 | A | A |
| E5 | LLDPE/tie/B4/tie/LLDPE | 42/5/5/4/39 | 14.3 | 6.6 | B | 69.6 | 247.7 | A | — |
| CE1 | LLDPE/tie/B5/tie/LLDPE | 42/6/15/6/41 | — | — | A | 56.9 | 279.1 | C | A |
| CE2 | LLDPE/tie/B6/tie/LLDPE | 39/6/14/6/42 | — | — | A | 79.8 | 302.6 | C | — |
| CE3 | LLDPE/tie/B7/tie/LLDPE | 40/6/3/5/41 | — | — | A | 27.0 | 83.7 | A | C |
| CE4 | LLDPE/tie/B7/tie/LLDPE | 41/6/1/4/42 | — | — | C | Fail | Fail | — | — |
| CE5 | LLDPE/tie/B8/tie/LLDPE | 41/6/3/4/38 | 15.0 | 6.9 | A | 48.4 | 155.2 | A | C |
| CE6 | LLDPE/tie/B9/tie/LLDPE | 42/6/4/6/38 | 7.5 | 3.5 | C | Fail | Fail | — | — |
| CE7 | LLDPE/tie/B10/tie/LLDPE | 42/4/3/6/41 | 12.0 | 10.5 | A | 35.3 | 106.0 | A | — |
| CE8 | LLDPE/tie/B11/tie/LLDPE | 41/6/3/4/43 | 10.0 | 8.8 | A | 42.3 | 126.9 | A | — |

TABLE 2-continued

| | Film structure | Measured Thickness (μm) | X value | Y value | Film quality A < B < C | OTR cc/ m²·day·atm 20° C./65% RH | CO2TR cc/ m²·day·atm 20° C./0% RH | Recyclability A > B > C | Storage test Cheese A > B > C |
|---|---|---|---|---|---|---|---|---|---|
| CE9 | LLDPE/tie/B1/tie/LLDPE | 40/6/5/5/38 | 20.0 | 9.2 | A | 45.1 | 147.8 | A | — |
| CE10 | LLDPE/tie/B3/tie/LLDPE | 41/5/5/6/42 | 16.7 | 7.7 | A | 54.1 | 178.6 | A | C |

The invention claimed is:

1. A gas permeable film comprising:
an ethylene-vinyl alcohol copolymer (A),
a polyolefin (B), and
an acid-modified ethylene-α-olefin copolymer (C),
wherein a mass ratio [(A)/((B)+(C))] of the ethylene-vinyl alcohol copolymer (A) to a total amount of the unmodified polyolefin (B) and the acid modified ethylene-α-olefin copolymer (C) is from 78/22 to 62/38, and
an oxygen permeability of the gas permeable film at 20° C./65% RH is 11 cc·20 μm/m²·day·atm or more, and 100 cc·20 μm/m²·day·atm or less.

2. The gas permeable film according to claim 1, wherein an ethylene content of the ethylene-vinyl alcohol copolymer (A) is at least 45 mol %.

3. The gas permeable film according to claim 1, wherein a thickness of the gas permeable film is from 2 μm to 30 μm.

4. The gas permeable film according to claim 1, wherein the gas permeable film has a matrix and domain structure, wherein the matrix comprises the ethylene-vinyl alcohol copolymer (A), and the domain comprises the polyolefin (B) and the acid-modified ethylene-α-olefin copolymer (C).

5. The gas permeable film according to claim 1, wherein the polyolefin (B) comprises at least one selected from the group consisting of polyethylenes; polyethylene copolymer resins; polypropylene resins; polybutenes; polypentenes; graft polyolefins; cyclic polyolefin resins; ionomers; an ethylene-vinyl acetate copolymer; an ethylene-acrylic acid copolymer; an ethylene-acrylic acid ester copolymer.

6. The gas permeable film according to claim 1, wherein
the acid-modified ethylene-α-olefin copolymer (C) obtained by copolymerization in which part of monomers constituting an ethylene-α-olefin copolymer is substituted by α,β-unsaturated carboxylic acid or anhydride monomers thereof; or by introducing α,β-unsaturated carboxylic acid or an anhydride thereof to part of side chains by graft reaction;
the monomers constituting an ethylene-α-olefin copolymer comprise at least one selected from the group consisting of propylene, 1-butene, 1-hexene, 1-octene, 4-methyl-1-pentene, 1-decene, 1-dodecene, 1-tridecene, 1-tetradecene, 1-pentadecene, 1-hexadecene, 1-heptadecene, 1-octadecene, and 1-nonadecene; and
the α,β-unsaturated carboxylic acids or the anhydrides thereof comprise at least one selected from the group consisting of maleic acid, acrylic acid, itaconic acid, crotonic acid, maleic anhydride, and itaconic anhydride.

7. The gas permeable film according to claim 1, wherein the acid-modified ethylene-α-olefin copolymer (C) has an acid value from 1 mg KOH/g to 50 mg KOH/g and/or a density of 0.9 g/cm³ or less.

8. The gas permeable film according to claim 1, wherein X value calculated by formula (a) is from 7.6 to 14.9:

$$X=[1/(100-R)]\times T\times 100 \quad (a)$$

in which R is the mass ratio [(A)/((B)+(C))] of the ethylene-vinyl alcohol copolymer (A) to a total amount of the unmodified polyolefin (B) and the acid modified ethylene-α-olefin copolymer (C), and T is a thickness of said gas permeable film; and/or
wherein Y value calculated by formula (b) is from 3.6 to 6.8:

$$Y=X/(0.001\times EXP(0.16\times E)) \quad (b)$$

in which X is calculated by formula (a); and
E is ethylene content (mol %) of the ethylene-vinyl alcohol copolymer.

9. A multilayer article comprising a gas permeable film gas permeable film comprising:
an ethylene-vinyl alcohol copolymer (A),
a polyolefin (B), and
an acid-modified ethylene-α-olefin copolymer (C),
wherein a mass ratio [(A)/((B)+(C))] of the ethylene-vinyl alcohol copolymer (A) to a total amount of the unmodified polyolefin (B) and the acid modified ethylene-α-olefin copolymer (C) is from 78/22 to 62/38, and
an oxygen permeability of the gas permeable film at 20° C./65% RH is 11 cc·20 μm/m²·day·atm or more, and 100 cc·20 μm/m²·day·atm or less.

10. The multilayer article according to claim 9, wherein an ethylene content of the ethylene-vinyl alcohol copolymer (A) is at least 45 mol %.

11. The multilayer article according to claim 9, wherein the gas permeable film has a matrix and domain structure, wherein the matrix comprises the ethylene-vinyl alcohol copolymer (A), and the domain comprises the polyolefin (B) and the acid-modified ethylene-α-olefin copolymer (C).

12. The multilayer article according to claim 9, wherein the polyolefin (B) comprises at least one selected from the group consisting of polyethylenes; polyethylene copolymer resins; polypropylene resins; polybutenes; polypentenes; graft polyolefins; cyclic polyolefin resins; ionomers; an ethylene-vinyl acetate copolymer; an ethylene-acrylic acid copolymer; an ethylene-acrylic acid ester copolymer.

13. The multilayer article according to claim 9, wherein
the acid-modified ethylene-α-olefin copolymer (C) obtained by copolymerization in which part of monomers constituting an ethylene-α-olefin copolymer is substituted by α,β-unsaturated carboxylic acid or anhydride monomers thereof; or by introducing α,β-unsaturated carboxylic acid or an anhydride thereof to part of side chains by graft reaction;
the monomers constituting an ethylene-α-olefin copolymer comprise at least one selected from the group consisting of propylene, 1-butene, 1-hexene, 1-octene, 4-methyl-1-pentene, 1-decene, 1-dodecene, 1-tridecene, 1-tetradecene, 1-pentadecene, 1-hexadecene, 1-heptadecene, 1-octadecene, and 1-nonadecene; and
the α,β-unsaturated carboxylic acids or the anhydrides thereof comprise at least one selected from the group consisting of maleic acid, acrylic acid, itaconic acid, crotonic acid, maleic anhydride, and itaconic anhydride.

14. The multilayer article according to claim 9, wherein the acid-modified ethylene-α-olefin copolymer (C) has an acid value from 1 mg KOH/g to 50 mg KOH/g and/or a density of 0.9 g/cm$^3$ or less.

15. The multilayer article according to claim 9, wherein X value of the gas-permeable film calculated by formula (a) is from 7.6 to 14.9:

$$X=[1/(100-R)]\times T\times 100 \quad (a)$$

in which R is the mass ratio [(A)/((B)+(C))] of the ethylene-vinyl alcohol copolymer (A) to a total amount of the unmodified polyolefin (B) and the acid modified ethylene-α-olefin copolymer (C), and T is a thickness of said gas permeable film; and/or wherein Y value of the gas-permeable film calculated by formula (b) is from 3.6 to 6.8:

$$Y=X/(0.001\times \mathrm{EXP}(0.16\times E)) \quad (b)$$

in which X is calculated by formula (a); and

E is ethylene content (mol %) of the ethylene-vinyl alcohol copolymer.

16. The multilayer article according to claim 9, wherein the multilayer article is recyclable.

17. The multilayer article according to claim 9, wherein carbon dioxide transmission rate (CO2TR) of the multilayer article at 20° C./0% RH in accordance with ASTM F2476-13 is greater than 200 cc/m$^2$·day·atm and less than 600 cc/m$^2$·day·atm, and/or oxygen transmission rate (OTR) of the multilayer article at 20° C./65% RH in accordance with ASTM F1927-14 is greater than 50 cc/m$^2$·day·atm and less than 150 cc/m$^2$·day·atm.

18. The multilayer article according to claim 9, comprising the gas permeable film as a core layer (E), an outer layer (T) comprising a hydrophobic thermoplastic resin, and an adhesive layer (AD) between the core layer and the outer layer.

19. The multilayer article according to claim 18, wherein the multilayer article comprises layers in an order of T/AD/E/AD/T or T/T/AD/E/AD/T/T.

20. The multilayer article according to claim 18, wherein the adhesive layer (AD) comprises an acid-functionalized polymer resin composition.

21. The multilayer article according to claim 18, wherein a total thickness of the multilayer article is from 50 μm to 500 μm, a thickness of the outer layer (T) is from 20 μm to 250 μm, and/or a thickness of the adhesive layer (AD) is from 2 μm to 30 μm.

\* \* \* \* \*